Figure 1:
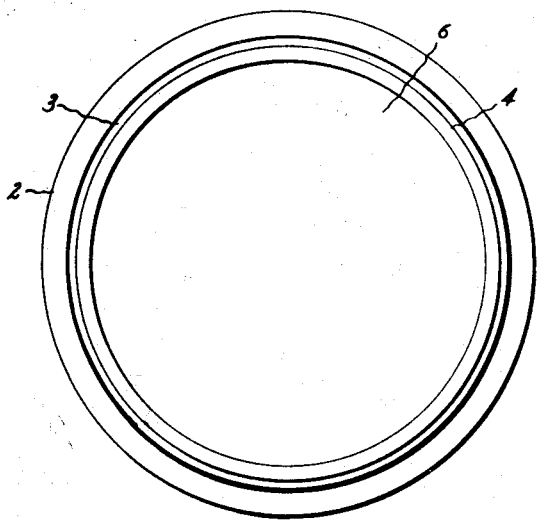

April 9, 1940.  C. W. HEWLETT  2,196,830
PHOTOELECTRIC CELL
Original Filed May 29, 1937

Inventor:
Clarence W. Hewlett,
by Harry E. Dunham
His Attorney.

Patented Apr. 9, 1940

2,196,830

UNITED STATES PATENT OFFICE 2,196,830

PHOTOELECTRIC CELL

Clarence W. Hewlett, Schenectady, N. Y., assignor to General Electric Company, a corporation of New York Application May 29, 1937, Serial No. 145,538
Renewed September 2, 1939

6 Claims. (Cl. 136—89)

The present invention relates to light-sensitive devices, more particularly to photoelectric cells, which generate a measurable electromotive force when subjected to light of practical intensities.

In my application Serial No. 145,540, filed May 29, 1937, and entitled "Photoelectric cell," I have disclosed and claimed a photovoltaic cell which in a general way consists of a base member coated with selenium and a composite metal layer. This metal layer is preferably laid down by sputtering and is semitransparent to light. When light shines on the metal layer, an electromotive force is generated at the junction between the metal layer and the selenium coating, and the current produced is conducted from the cell by leads secured in any suitable manner to the composite layer and the base member. This current is of sufficient intensity to be measured by a microammeter which may be calibrated in foot candles to indicate the intensity of the light impinging on the metal layer.

In order to facilitate a connection between one of the conductors and the thin metal layer, a ring of metal such as cadmium is sprayed by means of a Schoop gun onto the cell, either before or after the metal layer has been applied. It has been found that unless extreme precaution is taken when applying this metal ring, the heat of the metal and the force with which it impinges on the layer may be sufficient to strike through the selenium to the base plate beneath. This action of course results in a partial short circuit of the cell and is often sufficient to render the device entirely inoperative. The present invention therefore is directed to a cell in which this striking-through effect is substantially reduced or preferably eliminated. Thus an object is to provide an improved form of photovoltaic cell, and in particular, to prevent short circuit between the sputtered layer and the base plate.

It has further been found in connection with cells of the usual construction and provided with contact rings, that a portion of the generated current does not flow through the meter but instead, flows from the unilluminated portions of the cell, directly under the contact ring, back to those portions of the selenium from which it started under the influence of the light. It will be understood that the current generated between the metal and selenium layers passes conductively through the metal layer in outwardly radial directions. This current collects at the contact ring. There are two alternative paths open to the current at this point. A part of the current, the useful portion, travels through the conductor connected to the ring and thence through the meter back through another conductor to the base plate and the selenium layer. Another part of the current, the non-useful portion, travels downwardly from the contact ring through that part of the selenium layer directly under the contact ring to the base plate, then radially inwardly through the latter and finally upwardly through parts of the selenium layer other than the part through which the current had traveled downwardly. Thus a complete circuit is established which in effect shunts the meter and causes current loss. Another object, therefore, is to decrease the undesired current of this character. These objects are carried out in brief, by providing a resistance member in the form of an excess of selenium directly under the contact ring so that the selenium coating does not have the same thickness throughout its area but instead, has an increased thickness at the position where the cell might tend to short-circuit and where some of the current flows without passing through the external circuit.

Figure 2:
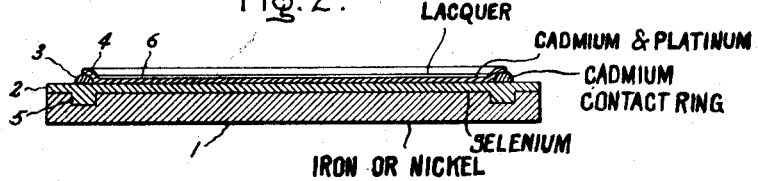

The invention will be better understood when reference is made to the following specification and the accompanying drawing in which Fig. 1 is a plan view of the improved cell and Fig. 2 is a section taken through the cell. Referring to the drawing, numeral 1 designates a circular disk constituted of a base metal such as iron or nickel. On one side of the disk, on the upper side as shown, there is a thin layer of selenium 2 which may be coated on the disk in any suitable and well-known manner. Selenium may be evaporated as a layer onto one side of the disk but preferably the selenium is applied as a paste. For this purpose, the disk is placed in a heated fixture (not shown) which has a recess of a depth to accommodate the disk and the desired thickness of selenium layer. After the selenium paste has been applied, a scraper is moved over the surface of the fixture, leaving a thin layer of selenium. The disk is then quickly cooled and afterwards is given a hot press treatment in a heated fixture (not shown) which is designed to apply pressure to the selenium layer, pressing it out to the final thickness. The coated disk is then placed in an oven at a temperature of approximately 180° C. to 215° C. and held at this temperature for a time interval determined by experiment and depending upon the quality and kind of selenium employed. This time interval will usually be between a few minutes and several hours. The heat treatment converts the selenium into the metallic light-sensitive form.

In order to conduct away from the cell the current which is generated at the junction between the metal layer referred to hereinafter and the selenium, a contact ring 3 of substantial thickness and of annular configuration may be applied to the metal layer, but preferably directly to the selenium layer before the metal layer is applied. This ring may be constituted of cadmium and is sprayed onto the selenium by means of a Schoop gun. The inner and outer boundaries of the contact ring are determined by a suitably shaped fixture (not shown) which covers the entire area of the selenium surface except at the place where it is desired to spray the ring. It has been found in practice that unless extreme care is used in spraying this ring, the heat of the sprayed metal and the force with which it strikes the layer may be sufficient to puncture the selenium. This causes a direct short circuit between the contact ring and the iron base, rendering the cell inoperative. In order to prevent puncture of the selenium layer when the contact ring is sprayed and in accordance with the present invention, I provide an excess of selenium directly under the ring. This excess is preferably contained in an annular groove or channel 5 formed in the base plate 1. As shown on the drawing, this groove is preferably wider than the width of the contact ring.

On top of the selenium layer there is deposited, preferably by sputtering, a thin, semitransparent layer 4 of a composite metal which may consist of cadmium and a relatively non-oxidizable metal such as platinum. A mask (not shown) which fits around the periphery of the disk may be employed to prevent the sputtered layer from reaching the edge of the disk. This layer is conveniently obtained from a sputtering electrode of a composite character, for example, a circular disk of cadmium having a number of equidistantly spaced inserts of platinum, as is disclosed and claimed in my copending application referred to hereinbefore. The area of the platinum inserts in aggregate is preferably equal to the active area of the cadmium electrode. Instead of employing a composite metal layer, it may be desirable to apply separate metal layers of each metal to the selenium coating. The metal layers are laid down successively with the cadmium next to the selenium, and platinum on top of the cadmium. In this case, two sputtering electrodes are used in succession, one being made entirely of cadmium and the other entirely of platinum. After the metal has been deposited, the cell preferably is lacquered or varnished as indicated at 6.

It is apparent that there is an annular portion of the cell under the contact ring which serves no useful purpose, since this portion is unilluminated. However, this unilluminated portion serves as a current path by which the photo-electrons may pass through the selenium layer to the iron base plate and thence redistribute themselves to their starting points. In accordance with the present invention, it has been found advantageous to increase the resistance of this portion of the current path by increasing the thickness of the selenium to be traversed at this point. The groove 5 and its contained excess of selenium serve to increase the resistance of the path taken by these undesired currents.

A cell of the type described may be mounted in a casing (not shown), and a microammeter connected to the conductors (not shown) which are taken from the contact ring and the iron base. When light shines on the exposed portion of the metal layer, the current generated in the cell is sufficient to operate the microammeter which may be calibrated in terms of foot candles to indicate the intensity of light falling on the cell.

What I claim as new and desire to secure by Letters Patent of the United States is:

1. A photovoltaic cell comprising an electrically conductive base member coated successively with selenium and a semitransparent layer of cadmium and a relatively non-oxidizable metal on the selenium, a contact member on said cell and electrically connected to said metal layer, and means including an excess of selenium in line with said ring and base member for preventing short circuit between the metal layer and the base member.

2. A photovoltaic cell comprising an electrically conductive base member coated successively with selenium and a semitransparent layer of cadmium and a relatively non-oxidizable metal, a contact member on said cell and electrically connected to said metal layer, and means including a groove in said base member for preventing short circuit of the selenium coating at a position between said contact member and the base member, said groove being directly under said contact member and containing selenium.

3. A photovoltaic cell comprising an electrically conductive base member coated successively with selenium and a semitransparent layer of cadmium and a relatively non-oxidizable metal, a contact member on said cell electrically connected to said layer, said base member having a groove in line with the contact member and the base member and positioned on the face of the base member coated with selenium, said groove containing selenium.

4. A photovoltaic cell comprising an electrically conductive base member coated successively with selenium and a semitransparent layer of cadmium and a relatively non-oxidizable metal, a contact member on said cell, and means including an excess of selenium in line with said contact member and base member for increasing the resistance of the path that the photo current takes through the cell directly under said contact member.

5. A photovoltaic cell comprising an electrically conductive base member coated successively with selenium and a semitransparent layer of cadmium and a relatively non-oxidizable metal, a contact member on said cell electrically connected to said layer, and means for increasing the resistance of the current path directly under the contact member, said means comprising a resistance element at a position directly between said contact member and the base member.

6. A photovoltaic cell comprising an electrically conductive base member coated successively with selenium and a semitransparent layer of cadmium and a relatively non-oxidizable metal, a contact member on said cell electrically connected to said layer, and means for increasing the resistance of the current path directly under said contact member, said means comprising an excess of selenium at a position directly between said contact member and the base member.

CLARENCE W. HEWLETT.